Figure 1:
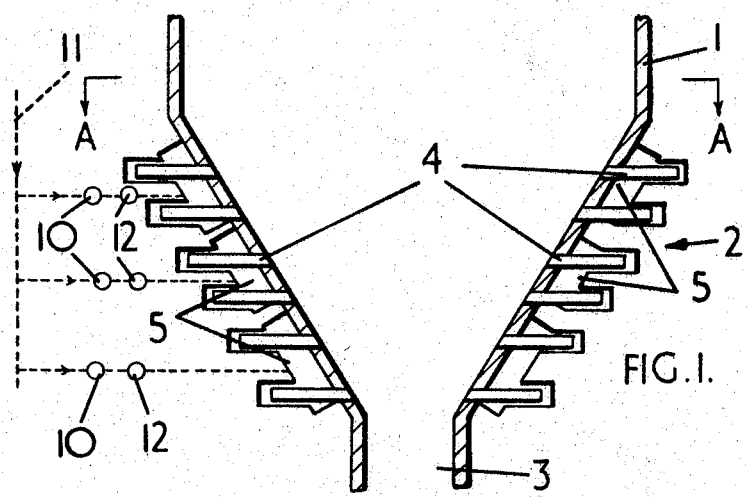

Inventor
Donald Bremner Urquhart
By Stevens, Davis, Miller & Mosher
Attorneys

United States Patent Office 3,332,853
Patented July 25, 1967

3,332,853
APPARATUS FOR EFFECTING DENSE PHASE FLUIDISATION OF PARTICULATE MATERIAL
Donald Bremner Urquhart, Hurley, Atherstone, England, assignor to Coal Industry (Patents) Limited, London, England, a company of Great Britain
Filed June 21, 1963, Ser. No. 289,675
Claims priority, application Great Britain, June 22, 1962, 24,108/62
1 Claim. (Cl. 202—121)

This invention relates to improvements in methods and apparatus for effecting dense phase fluidisation of particulate materials, for example particulate coal and has particular, although no exclusive, application to the partial carbonisation of relatively fine coal in a fluidised bed, such as is described, for example, in our pending patent application Serial No. 35,438, now Patent Number 3,093,463 relating to the manufacture of smokeless briquettes. By "dense phase fluidisation" is meant the formation of a dense turbulent mass of particles by an upward flow of gas, the mass having physical properties similar to those of a liquid.

When partially carbonising coal in a fluidised bed, there are two conflicting requirements with regard to the quantity of oxygen supplied to the bed for carbonising purposes: the carbonising process requires as high an oxygen content as possible, but on safety grounds it is undesirable to have a high oxygen percentage above the fluidised bed. In fluidising relatively large quantities of coal, it is found that it is uneconomic to pre-treat the coal to provide particles of a specific and narrow size range. Hence in practice it is economically necessary to supply to a fluidised bed coal having a particle size at least in the range zero to ⅛ inch. To satisfactory fluidise coal having particles of such a size range, a relatively high velocity of fluidising gas is necessary in order to fluidise the larger particles. However, such a high gas velocity inevitably results in a high proportion of the finer particles being carried upwardly in the gas stream from the fluidising bed, and in addition results in an undesirably high proportion of oxygen above the bed.

An object of the present invention is to provide an improved apparatus for effecting fluidisation of particulate material having a relatively large size range.

According to the present invention there is provided apparatus for effecting dense phase fluidisation of particulate material, wherein the material to be treated is introduced into a reactor vessel provided with a conical base having sides inclined to the horizontal at an angle greater than the angle of internal friction (as hereinafter defined) of the said material with the cone axis vertical, and having a discharge opening for the discharge of treated material, located at or towards the apex of the conical base, whilst fluidising gas is passed upwardly through the material from a plurality of gas inlets spaced around the curved surface of the conical base, the inlets being so arranged and the gas flows therethrough being so controlled that the rate of upward flow of gas is substantially constant over any selected horizontal cross-sectional area of the conical base. It will be understood that by "conical base" is meant a base of generally conical or frusto-conical shape, and that a substantially constant gas flow will not necessarily be present in the marginal zones of the conical base immediately adjacent the cone walls. The angle of internal friction as herein used is defined as the angle to the horizontal assumed by the conical boundary surface of the moving core of particulate material formed when a mass of the material in a container is flowing in free fall through a central outlet of the container.

In using the apparatus in accordance with the invention, a relatively slow fluidising gas velocity can be employed since the relatively large particles of material which do not fluidise in a slow moving gas stream continuously run down the inclined sides of the conical base for discharge through the apical discharge opening and do not in consequence form possible sources of local overheating.

Figure 2:
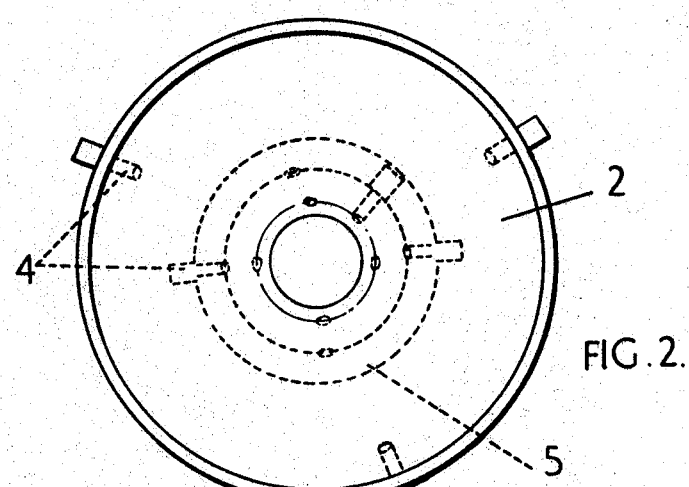

One embodiment of the invention will be hereinafter described by way of example only with reference to the accompanying drawings in which:

FIGURE 1 shows schematically, in vertical section, the base of a reactor constructed in accordance with the present invention, and in which the method of the present invention can be carried out;
FIGURE 2 shows a plan view; and
FIGURE 3 to a larger scale an inlet for fluidising gas.

Referring firstly to FIGURES 1 and 2 of the drawings, a fluidising reactor suitable for treating particulate coal having a size range 0 to ⅛ inch comprises an upper cylindrical portion 1 (the lower part only of which is shown in FIGURE 1) which terminates at its lower extremity in a conical base 2 having sides inclined to the horizontal at an angle of 60°, i.e. at an angle greater than the angle of internal friction of the material to be treated. The lower extremity of the conical base 2 opens into a central outlet passage 3 constituting an apical discharge opening for the discharge of treated material. Both the cylindrical portion 1 and the conical base 2 are formed of suitable refractory material capable of withstanding without damage the relatively high temperature generated within the reactor.

Extending around the curved surfaces of the conical base 2, and opening into the inner region thereof, are a plurality of vertically spaced rows of inlets 4 (only a few inlets 4 are shown in FIGURE 2). The inlets 4 have axes disposed normal to the axis of the conical base 2 and extend from three vertically spaced manifolds 5 each of generally rectangular section and each extending circumferentially around the conical base 2. Fluidising gas, e.g. mixtures of air and inert gas, is supplied to each manifold 5, the gas flows being indicated by chain lines in FIGURE 1. Each manifold has an associated pressure control valve 10 for adjusting the pressure of fluidising gas supplied to it from a common gas supply line 11, and the gas flow passing to each manifold 5 is indicated by a flow meter 12 in the supply line to the respective manifold. In operation the lowermost manifold 5 is supplied with fluidising gas at a higher pressure than the intermediate manifold 5 which in turn is supplied with gas at a higher pressure than that supplied to the uppermost manifold 5. This feature of increasing pressure with depth of bed counteracts the resistance to gas flow at the inlet opening which arises from the back pressure exerted by the bed of particulate material within the conical base 2.

Figure 3:
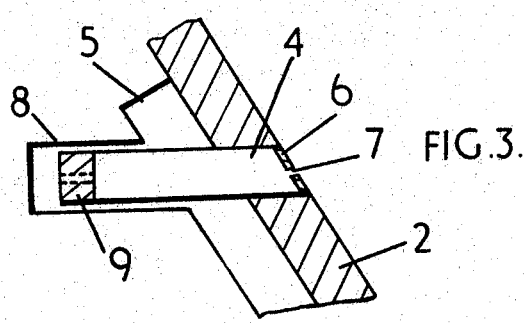

Referring now to FIGURE 3 of the drawing, each inlet 4 comprises a cylindrical tube having an end terminating flush with the interior sides of the conical base 2 this end of the inlet 4 being partially closed by an end plate 6 of generally circular form provided with a relatively small aperture 7 forming an inlet into the conical base 2 for fluidising gas. Fluidising gas on issuing from the small apertures 7 undergoes a pressure drop which tends to prevent particulate material entering the inlets 4.

Each inlet 4 projects beyond the outer side of the respective manifold 5, and this projecting portion of the inlet is enclosed by a blanked-off tube 8, the gas path from the manifold to the inlet being provided between the outer surface of the inlet and the interior of the tube 8. The end of each inlet remote from the conical base 2 incorporates a metering orifice 9 which imparts to the flowing gas a pressure drop greater than the pressure drop which occurs when the gas issues through the apertures 7. The metering orifices serve to even out the air flow from inlets connected to the same manifold.

The inlets 4 are evenly distributed over the curved surface of the conical base and each is adapted to pass the same quantity of gas. The pressure of gas at each inlet is determined by the particular manifold to which the inlet is connected, these latter pressures being controlled to give a fluidising velocity in the lower region of the cylindrical portion 1 lower than the terminal falling velocity of the largest particles, for example, with particles of ⅛ inch, the velocity would be 1–2 feet per second.

In operation, the particulate coal is introduced into the reactor through a materials inlet (not shown) located in the upper cylindrical part 1 of the reactor, and a fluidised bed is established in the reactor by the fluidising gases admitted into the conical base 2. The level of the fluidised bed is established above the junction between the upper cylindrical part 1 and the conical base 2. The upward rate of gas flow is controlled at a relatively low value so that the relatively finer particles of the coal are not carried upwardly from the bed by the air flow and a relatively high percentage of oxygen does not occur above the bed. The coarser particles which are not in consequence of the relatively low fluidising gas velocity, fluidised, slide down the inclined sides of the conical base 2, the angle to the horizontal of which, in being greater than the internal angle of friction of the material, ensures that these larger particles do not tend to rest on the sides and hence cause local spots of overheating.

I claim:

Apparatus for the partial carbonisation of particulate carbonaceous material having a relatively large size range, comprising a reactor provided with an inverted conical base having sides inclined to the horizontal at an angle in the range of 50° to 70° and greater than the angle of internal friction of the material to be treated, said base having walls defining a discharge opening for treated material located in the apex thereof and further defining a plurality of inlets spaced around the curved surface and adapted to introduce in a direction normal to the axis of said base the greater proportion of gas necessary to effect fluidisation, each inlet comprising a tube of which the inner end terminates in the same plane as the interior curved surface of said base and the outer end projects externally of said base, the said outer end having a metering constriction providing a pressure drop for gas flowing therethrough, the said inner end having a further metering constriction providing a relatively lower pressure drop, each inlet further having pressure control means for automatically adjusting the gas pressure according to the depth of material in said reactor whereby the rate of upward flow of fluidising gas is substantially constant over any selected horizontal cross-sectional area of the conical base.

References Cited

UNITED STATES PATENTS

| | | |
|---|---|---|
| 1,984,380 | 12/1934 | Odell. |
| 2,468,508 | 4/1949 | Munday. |
| 2,719,818 | 8/1955 | Findlay. |
| 2,886,307 | 5/1959 | Demmon _____ 266—30 |
| 3,057,701 | 10/1962 | Coates et al. _____ 23—284 |
| 3,074,777 | 1/1963 | Cortes _____ 23—284 X |
| 3,101,249 | 8/1963 | Priscu. |

FOREIGN PATENTS

| | | |
|---|---|---|
| 478,374 | 11/1951 | Canada. |
| 1,064,201 | 8/1959 | Germany. |
| 1,070,872 | 12/1959 | Germany. |
| 600,326 | 4/1958 | Great Britain. |

OTHER REFERENCES

Leva, Max, Fluidization, McGraw-Hill Book Company, Inc., New York (1959), pages 156–162.

MORRIS O. WOLK, *Primary Examiner.*

H. A. BIRENBAUM, R. M. REESE,

*Assistant Examiners.*